United States Patent [19]

Kim

[11] Patent Number: 5,381,730
[45] Date of Patent: Jan. 17, 1995

[54] JUICE EXTRACTOR

[76] Inventor: Jong Gill Kim, Hyundai Villa 301, 810-14 Bangbae-dong, Seocho-ku, Seoul, Rep. of Korea

[21] Appl. No.: 83,477

[22] Filed: Jun. 30, 1993

[51] Int. Cl.⁶ .................. A23N 1/00; A23N 1/02; A23L 1/212; A23L 2/06
[52] U.S. Cl. .................. 99/510; 99/495; 99/513; 100/98 R; 100/117; 100/145; 241/101.2; 241/260.1; 241/261; 366/84; 366/272; 366/301
[58] Field of Search .................. 99/495, 509–513, 99/348; 100/37, 53, 98 R, 117, 145, 121; 241/92, 101.1, 101.2, 260.1, 261; 366/83–85, 272, 297, 301; 426/481, 482, 489, 518, 616, 51

[56] References Cited

U.S. PATENT DOCUMENTS

| 244,961 | 7/1881 | Wenzel | 99/510 |
| 2,513,974 | 7/1950 | Thomas | 99/513 |
| 4,025,056 | 5/1977 | Miles et al. | 366/272 |
| 4,073,013 | 2/1978 | Blach | 366/301 |
| 4,363,265 | 12/1982 | Tanioka et al. | 100/117 |
| 4,643,085 | 2/1987 | Bertocchi | 99/510 |
| 4,774,097 | 9/1988 | Bushman et al. | 426/489 |
| 4,846,054 | 7/1989 | Mange et al. | 366/84 |
| 5,156,872 | 10/1992 | Lee | 99/495 |
| 5,249,514 | 10/1993 | Otto et al. | 99/510 |

FOREIGN PATENT DOCUMENTS 0707565 1/1980 U.S.S.R. .................. 99/513

Primary Examiner—Timothy F. Simone
Attorney, Agent, or Firm—Wenderoth, Lind & Ponack

[57] ABSTRACT

A juice extractor for extracting juice from raw juice containing materials includes a raw material supply hopper of a housing engaged with a main body. The juice extractor includes a pair of squeezing rollers engaged with each other and mounted in the housing. Each of the rollers includes a helical gear and a screw at its leading end portion. A filter surrounds the leading end portions of the squeezing rollers and a discharge section plate is mounted at the leading end portion of the housing and has a discharge pressure adjusting device. Ring gears made of synthetic resins are mounted at both sides of the helical gear of one of the squeezing rollers whereby an interval between the helical gears of squeezing rollers is maintained. Grooves are formed at both sides of the threads of the helical gears of each of the squeezing rollers at a location beneath the raw juice material supply hopper. The filter surrounding the leading end portions of the squeezing rollers includes a plurality of filter elements, each of which has a plurality of radial filter grooves formed at one side and has a bend at its middle part.

9 Claims, 5 Drawing Sheets

JUICE EXTRACTOR

BACKGROUND OF THE INVENTION

The present invention relates to a juice extractor, and particularly to a juice extractor for obtaining juice from raw juice containing material such as vegetables and fruits. Conventional juice extractors are constructed such that the raw juice containing material such as vegetables and fruits is compressed by a pair of squeezing rollers engaging each other to extract the juice. In an example of the prior art, U.S. Pat. No. 5,156,872 (Moon H. LEE) discloses a structure in which a pair of helical gears engaging each other is provided, and the pair of rollers forming a screw at the leading end portion is arranged in a filtering sieve. This patent reference teaches that the raw juice containing material is compressed by a pair of helical gears engaging each other, compressed again by a screw, and the juice obtained is filtered through the filtering sieve. However, in the juice extractor according to such U.S. patent, as the helical gears are engaging each other, metalline powder is generated and discharged with the juice due to abrasion of the metal constituting the helical gear during its rotation. As a result, there is a risk that the metalline powder may enter the human body when the user drinks the juice. Further, the filtering sieve is constructed with a metal plate having a plurality of minute holes such that juice can be separated from the dregs (i.e. the materials remaining after the juice has been extracted).

However, such filtering sieve has a drawback that such minute holes are closed by insertion of the dregs therebetween. Further, device is relatively complicated as the juice extractor must be washed with water and a brush after use. Also, the juice extractor according to U.S. Pat. 5,156,872 has a structure in which a discharge disc is mounted at the discharge outlets for the dregs, but the discharge pressure of the dregs needs adequate adjustment according to the different water content of the raw juice containing material.

SUMMARY OF THE INVENTION

One of the primary objects of the present invention is to solve the problems encountered in the prior art.

Another of the objects of the present invention is to prevent noise from occurring and to prevent metalline powder from being generated due to direct mutual engagement of helical gears of opposing squeezing rollers, by providing a minute space along major portions of the helical gears.

A further object of the present invention is to effectively strengthen compression of the raw juice containing materials by forming a screw at the leading end portion of the squeezing roller such that a thread pitch of the screw becomes narrower toward the leading end portion.

Still another object of the present invention is to effectively supply the raw juice containing material between nips of the helical gears engaging each other when the raw material is supplied from the supply hopper.

Another object of the present invention is to allow the device to be easily washed by forming the filter of a plurality of easily separable filtering elements having a plurality of radial filtering grooves.

A further object of the present invention is to increase the juice extraction rate by allowing free adjustment of the discharge pressure of the dregs when the residual dregs are discharged after extraction from the squeezing roller.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 1:
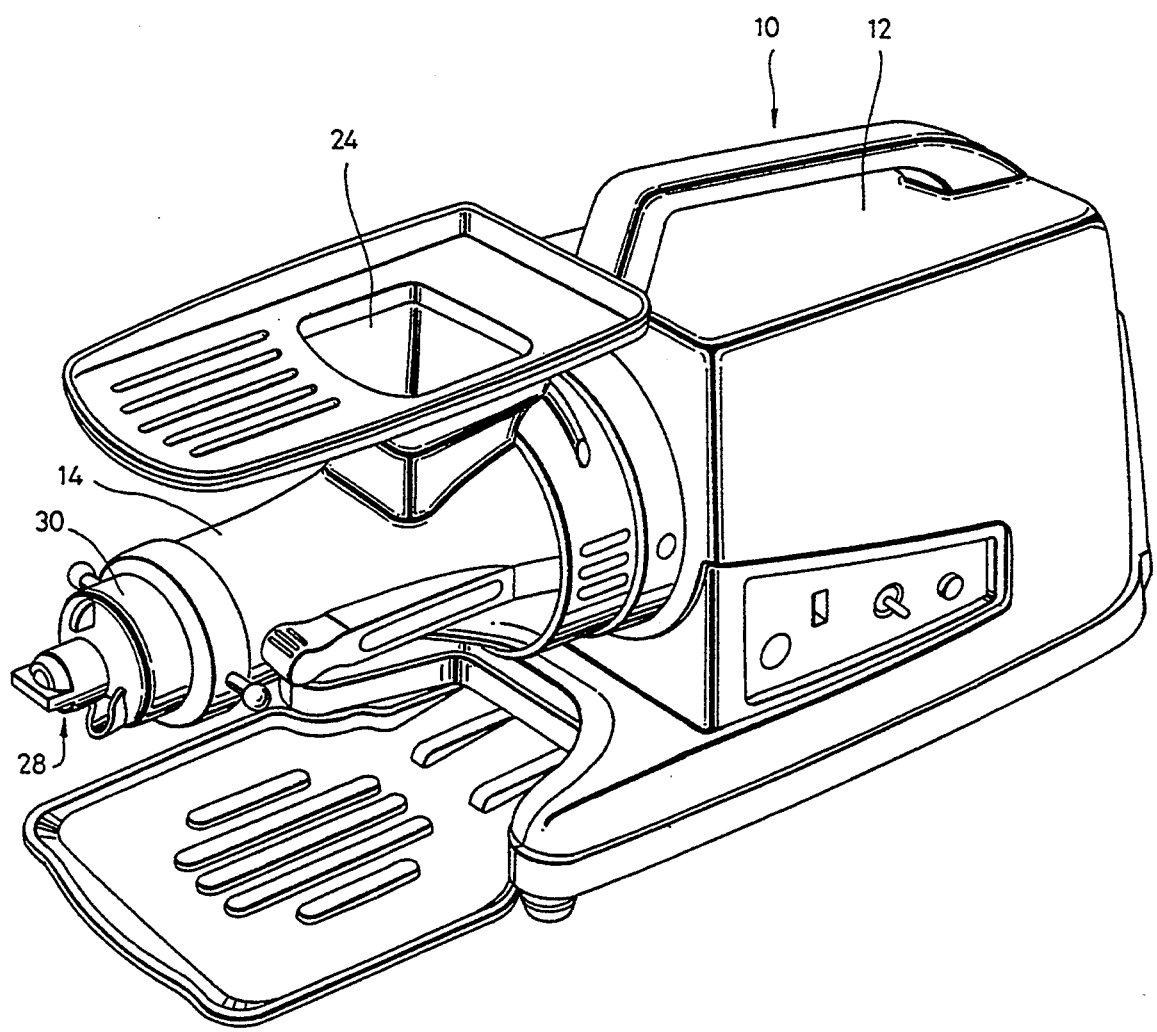
FIG. 1 is a perspective view of a juice extractor according to the present invention.
Figure 2:
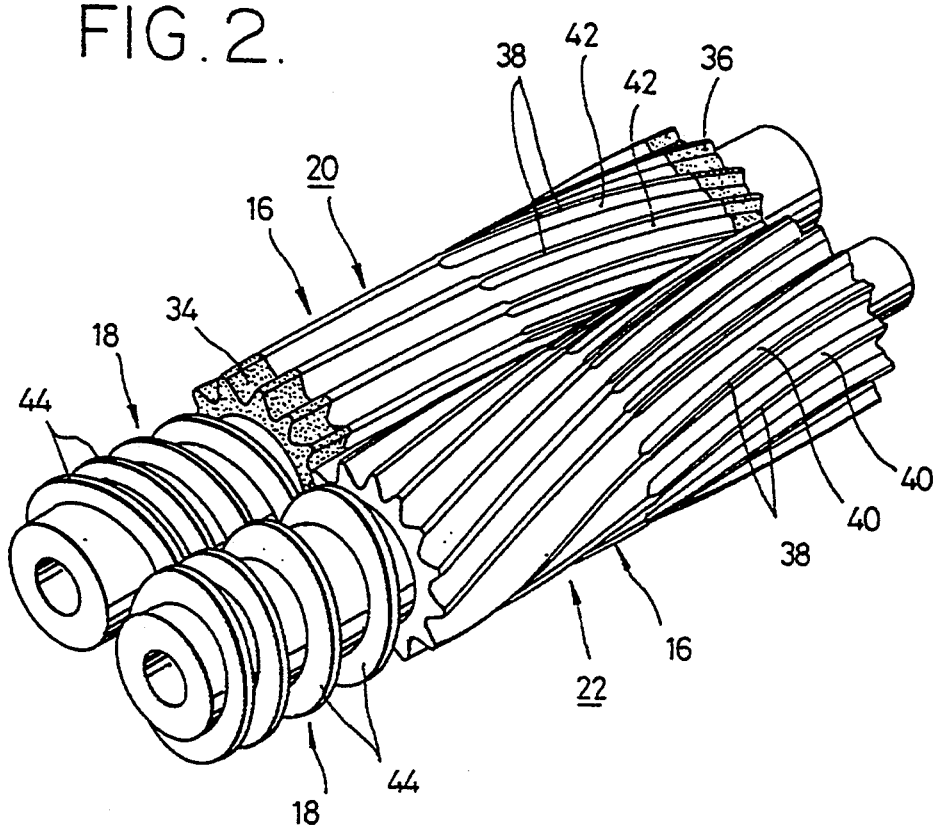
FIG. 2 is a perspective view of squeezing rollers of the juice extractor according to the present invention.

The present invention will be described in more detail with reference to the accompanying drawings. FIG. 1 illustrates the external appearance of a juice extractor according to the present invention. Such juice extractor 10 is constituted by a main body 12 and a housing 14 engaged to the front end of the main body 12. In the main body 12, an electric motor (not shown) is mounted, and in the housing 14, a pair of squeezing rollers 20, 22 engage each other and respectively constitute a helical gear 16 and a screw 18 at the leading end portion. The housing 14 has a supply lopper 24 for raw juice containing material at its top, and juice discharge outlet 26 is formed at a lower surface of the leading end portion. At the leading end portion, a discharge section plate 30 is provided and has a pressure adjusting device 28 for adjusting a discharge pressure of the dregs. Further, a filter 32 surrounds circumferential surfaces of the leading end portions of the squeezing rollers 20, 21 mounted within the housing 14.

Figure 3:
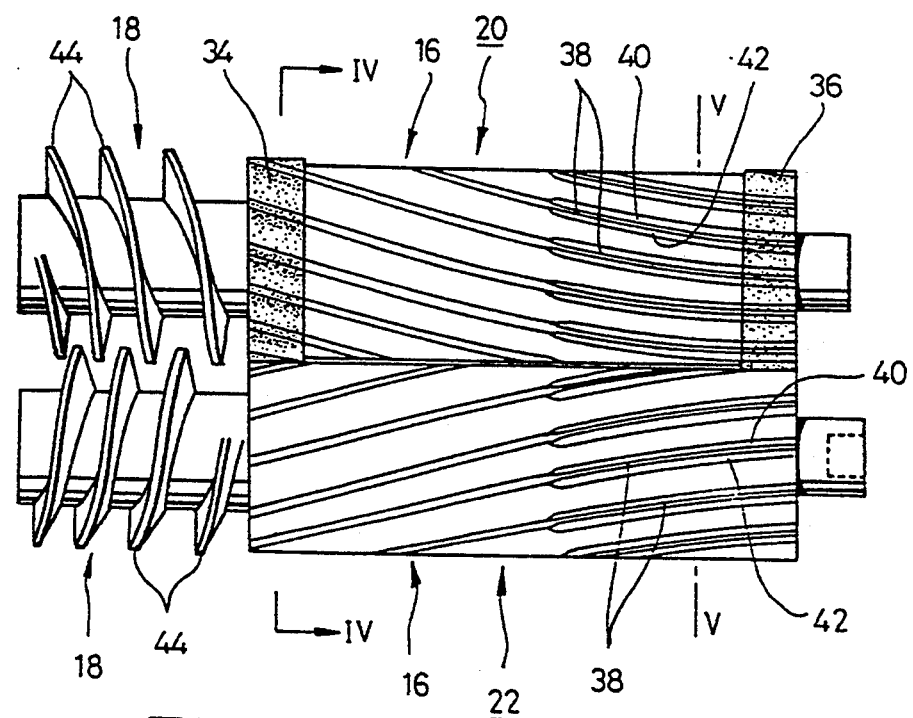
FIG. 3 is a top view illustrating the squeezing rollers of FIG. 2.
Figure 4:
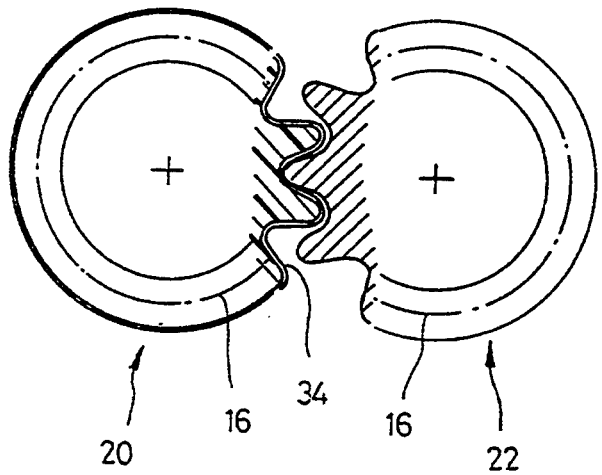
FIG. 4 is a sectional view taken on line IV—IV of FIG. 3.
Figure 5:
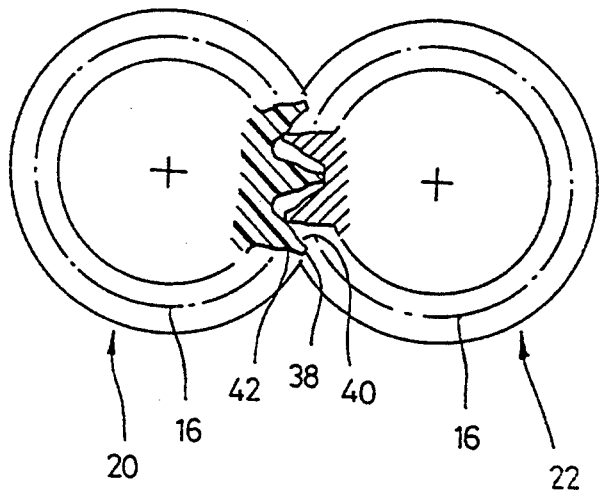
FIG. 5 is a sectional view taken on line V—V of FIG. 3.
Figure 6:
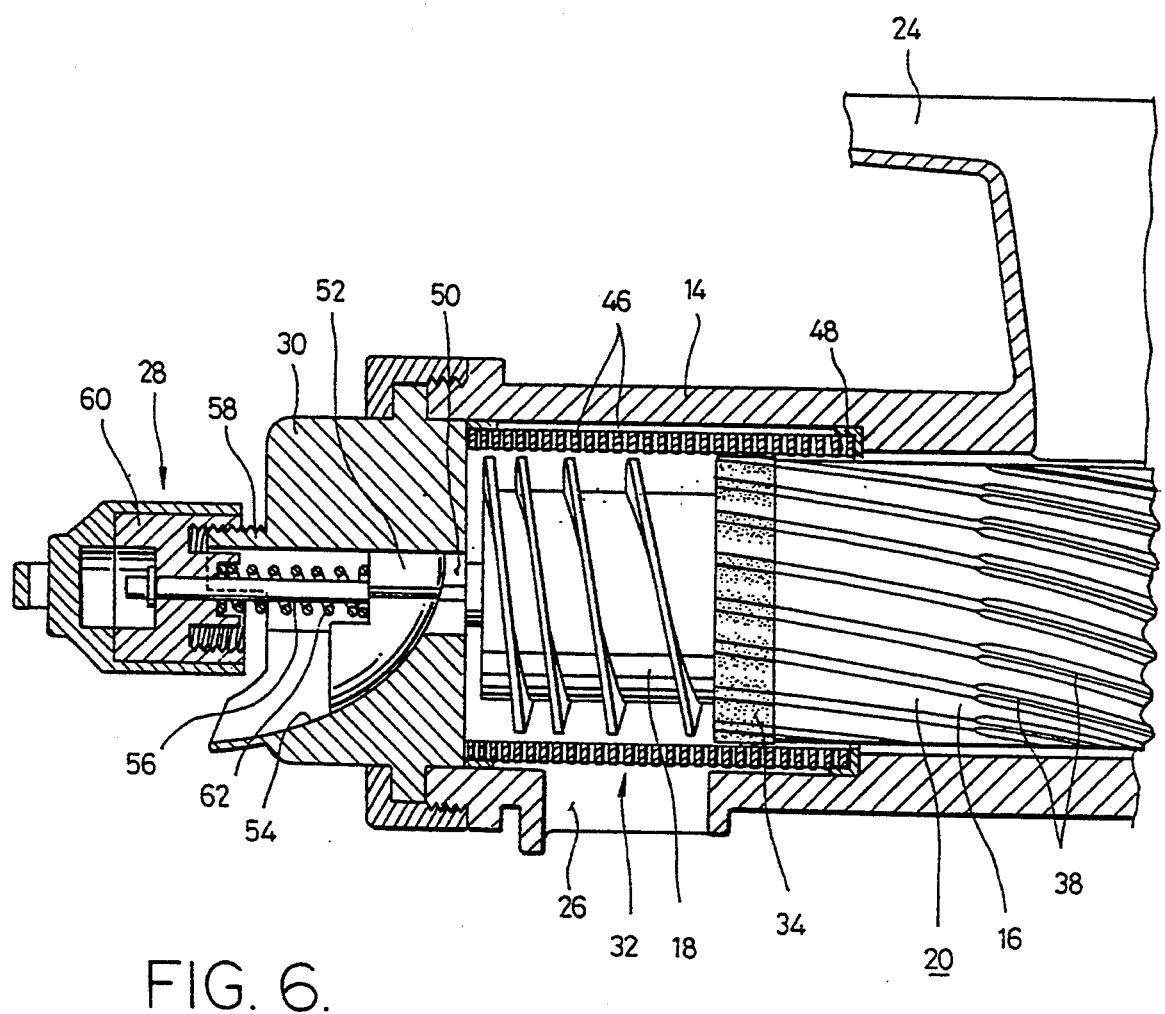
FIG. 6 is a partial end view showing a juice discharge end section according to the present invention.

Axially protruding end portions extend from both ends of both of the squeezing rollers 20, 22, as shown in FIG. 3. Rig gears 34, 36 made of synthetic resins are provided such that when the pair of squeezing rollers 20, 22 are engaged with each other, a certain space of about, for example 0.3–0.5 mm therebetween is maintained. Accordingly, as the helical gears 16 of the squeezing rollers 20, 22 are not in contact with each other except for the parts of the ring gears 34, 36, noise does not occur and metalline powder is not generated.

Further, at the part of each of the helical gears 16 positioned below the supply hopper 24, grooves 40, 42 are formed at both sides of each thread portion 38 of the helical gear 16. These grooves 40, 42 provide a wider space for feeding the raw juice containing material when the thread portions 38 of the helical gears 16 are engaged, whereby a smoother supply of the raw containing material is achieved.

Also, with regard to the screw 18 constructed at the leading end portion of the helical gear 16, the pitch interval of the thread 44 narrows toward the leading end portions of each of the squeezing rollers 20, 22, and thus the screw 18 causes the extracts of the raw juice containing material pushing out in the forward direction to be compressed gradually, thereby increasing the extraction power of the screw 18, and thus of the overall apparatus.

Figure 7:
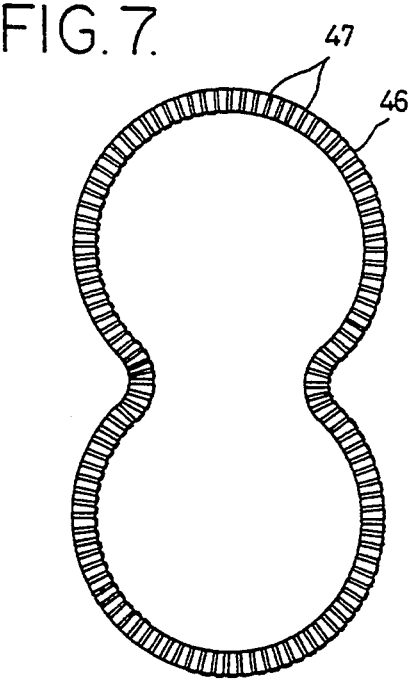
FIG. 7 is an elevational view of a filtering element.
Figure 8:
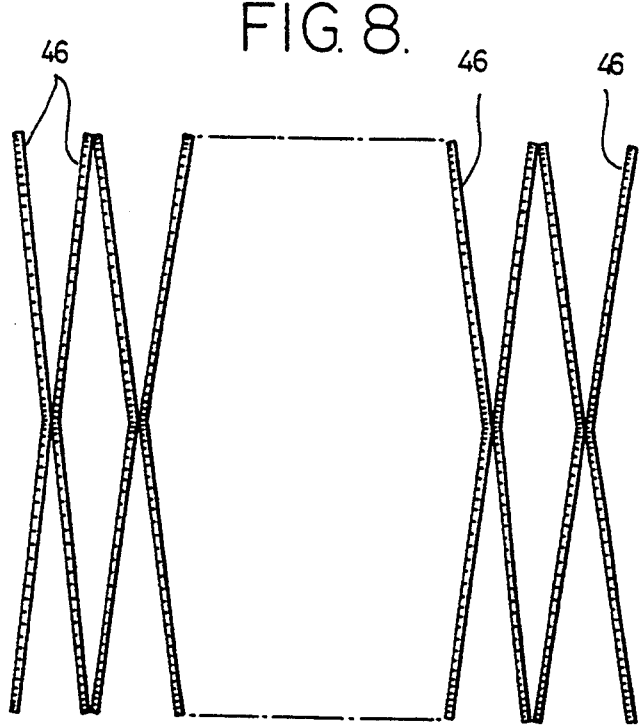
FIG. 8 is a side view showing a developing state of each filtering element.
Figure 9:
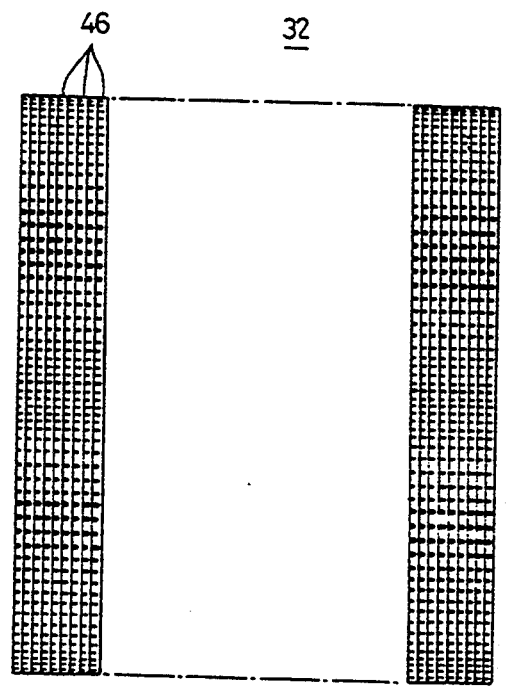
FIG. 9 is a side view showing an accumulating state of each filtering element.

Further, the filter 32 according to the present invention is constituted by a plurality of filtering elements 46 arranged as shown in FIG. 7. Each filtering element 46 is shaped as a figure "8" so as to be positioned around both squeezing rollers 20, 22. A plurality of filter grooves 47 are formed at one side of each of the filtering element 46 in a radial shape, and a middle part of the filtering element 46 is bent (FIG. 8). Thus, when a plurality of filtering elements 46 are provided within a cage 48 they become compressed as shown in FIG. 9, and the filter grooves 47 between the filtering elements 46 play the role of filter holes. In washing of the filter, the casing 48 is separated, and the filtering elements 46 become separated as shown in FIG. 8 by the elasticity of each element 46 due to the bent middle part thereof, thereby enabling easy washing with water.

Residual dregs from extracted juice materials are discharged through a discharge outlet 50 of the discharge section plate 30 which has a discharge pressure adjusting device 28. The discharge pressure adjusting device 28 is constituted by a discharge valve 52 arranged in the discharge hole 50. The discharge hole 50 is formed in the middle of the discharge section plate 30 and has a discharge path 54 slanted downwardly from the section side. An internal surface of the discharge path 54 acts as a valve seat and is in contact with the discharge valve 52. A valve stem 56 connects the discharge valve 52 to a plug 60 threaded onto a semicircular thread tube 58 formed at the front of the discharge section plate 30. And a spring 62 is mounted about the valve stem 56 to apply pressure to the discharge valve 52 at the valve seat, to enable regression of the valve stem 56 through the plug 60 by an adequate distance. By adjusting the degree of engagement of the plug 60 on the thread tube 58, the amount of pressure between the discharge valve 52 and the inner surface of the discharge path 54, i.e., the valve seat, can be adjusted. As the dregs are discharged by pushing the discharge valve 52 against the force of the spring 62, the discharge pressure of the dregs can be adjusted by rotating the plug 60.

I claim:

1. A juice extractor comprising:
   a housing having a first end portion and a second end portion;
   a pair of mutually engaging squeeze rollers rotatably mounted in said housing, each of said squeeze rollers having a first end portion positioned in said first end portion of said housing and a second end portion positioned in said second end portion of said housing, and each of said squeeze rollers comprising a helical gear portion at said first end portion thereof and a screw portion at said second end portion thereof;
   a filter surrounding said second end portions of said squeeze rollers;
   a discharge section plate mounted to said second end portion of said housing and having a discharge opening; and
   a discharge pressure adjusting device mounted to said discharge section plate.

2. A juice extractor as recited in claim 1, further comprising
   a main body attached to said housing; and
   a raw material supply hopper mounted to said housing and in communication with said squeeze rollers.

3. A juice extractor as recited in claim 2, wherein
   each of said helical gear portions comprises a plurality of threads; and
   grooves are formed on opposite sides of each of said threads of each of said helical gear portions at positions thereof below said raw material supply hopper.

4. A juice extractor as recited in claim 1, further comprising
   ring gears mounted at opposite ends of said helical gear portion of one of said squeeze rollers, said ring gears protruding from said one of said squeeze rollers, thereby maintaining an interval between said helical gear portions of said squeeze rollers, respectively.

5. A juice extractor as recited in claim 4, wherein
   said interval comprises a distance in the range of 0.3–0.5 mm.

6. A juice extractor as recited in claim 1, wherein
   for each of said squeeze rollers, said screw portion comprises screw threads having a pitch interval which narrows toward said second end portion of said screw portion.

7. A juice extractor as recited in claim 1, wherein
   said filter comprises at least one filter element which is bent at its middle portion; and
   said at least one filter element has a plurality of radially extending filter grooves formed in one side thereof.

8. A juice extractor as recited in claim 7, wherein
   said at least one filter element comprises a plurality of filter elements; and
   said filter further comprises a filter casing which encases said plurality of filter elements such that said filter elements are compressed against one another.

9. A juice extractor as recited in claim 1, wherein
   said discharge pressure adjusting device is mounted at said discharge hole and comprises a discharge valve elastically biased to a closed position, said discharge pressure adjusting device being operable to adjust an elastic biasing force of said discharge valve.

* * * * *